(12) United States Patent
Lee et al.

(10) Patent No.: US 7,680,186 B2
(45) Date of Patent: Mar. 16, 2010

(54) APPARATUS FOR ESTIMATING MOTION CONSIDERING CORRELATION BETWEEN BLOCKS AND METHOD THEREOF

(75) Inventors: Sung-hee Lee, Suwon-si (KR); Oh-jae Kwon, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1642 days.

(21) Appl. No.: 10/892,167

(22) Filed: Jul. 16, 2004

(65) Prior Publication Data

US 2005/0025244 A1 Feb. 3, 2005

(30) Foreign Application Priority Data

Jul. 29, 2003 (KR) .................... 10-2003-0052430

(51) Int. Cl.
H04N 7/12 (2006.01)
H04N 11/04 (2006.01)

(52) U.S. Cl. .............................. 375/240.16; 348/416.1

(58) Field of Classification Search ............. 348/402, 348/407, 409, 416, 699, 413, 420, 402.1, 348/416.1; 382/232, 236, 238, 107; 375/240.16, 375/240.12, 240.24, 240.08, 240.13, 240.17
See application file for complete search history.

(56) References Cited

U.S. PATENT DOCUMENTS

| | | | | |
|---|---|---|---|---|
| 5,818,969 A * | 10/1998 | Astle | ............................ | 382/236 |
| 6,192,080 B1 | 2/2001 | Sun et al. | | |
| 6,332,002 B1 * | 12/2001 | Lim et al. | ............... | 375/240.17 |
| 6,430,223 B1 * | 8/2002 | Lim | ....................... | 375/240.16 |
| 6,438,168 B2 * | 8/2002 | Arye | ..................... | 375/240.03 |
| 6,778,606 B2 * | 8/2004 | Kang et al. | ............. | 375/240.16 |
| 6,895,361 B2 * | 5/2005 | Yang | ......................... | 702/179 |
| 7,260,148 B2 * | 8/2007 | Sohm | ..................... | 375/240.16 |
| 2001/0008545 A1 | 7/2001 | Hideki et al. | | |
| 2002/0009143 A1 * | 1/2002 | Arye | ...................... | 375/240.16 |
| 2002/0041699 A1 * | 4/2002 | Kim | ........................... | 382/107 |
| 2002/0163968 A1 * | 11/2002 | Moschetti | .............. | 375/240.16 |

FOREIGN PATENT DOCUMENTS

CN 1154051 A 7/1997

(Continued)

OTHER PUBLICATIONS

Faouzi Kossentini et al.,—Predictive RD Optimized Motion Estimation for Very Low Bit-Rate Video Coding—IEEE Journal on selected areas in communications, vol. 15., No. 9, Dec. 1997, pp. 1752-1763.

(Continued)

*Primary Examiner*—Behrooz Senfi
(74) *Attorney, Agent, or Firm*—Sughrue Mion, PLLC (57) ABSTRACT

A motion estimation apparatus and a method considers a correlation between blocks. The motion apparatus includes a full search unit which divides a current frame/field into blocks of predetermined size and estimates an arbitrary motion vector of each block by a full search algorithm; a candidate motion vector estimating unit which computes a plurality of motion prediction error values by applying a block matching algorithm (BMA) to a current block and estimates candidate motion vectors from motion prediction error values below a predetermined threshold; a motion compensating unit which computes a correlation between respective candidate motion vectors and the motion vectors of adjacent blocks and compensates one among the candidate motion vectors to a final motion vector of the current block based on the computed correlation. By estimating motion vector of the current block in consideration of the correlation between the blocks, images free of block artifact can be provided.

19 Claims, 9 Drawing Sheets

FOREIGN PATENT DOCUMENTS

| | | |
|---|---|---|
| JP | 11-15429 A | 1/1999 |
| KR | 1999-0086428 A | 12/1999 |
| KR | 2003/0049537 A | 6/2003 |
| WO | WO 03-021966 A | 3/2003 |

OTHER PUBLICATIONS

Bede Liu et al.,—New Fact Algorithms for the Estimation of Block Motion Vectors—IEEE Transactions on Circuits and Systems for Video Technology, vol. 3, No. 2, Apr. 1993, pp. 148-157.

Alexis M. Tourapis et at.,—Highly Efficient Predictive Zonal Algorithms for Fast Block-Matching Motion Estimation—IEEE Transactions on Circuits and Systems for Video Technology, vol. 12, No. 10, Oct. 2002, pp. 934-947.

Yao Nie et al.,—Adaptive Rood Pattern Search for Fast Block-Matching Motion Estimation—IEEE Transactions on Image Processing, vol. 11, No. 12, Dec. 2002, pp. 1442-1449.

* cited by examiner

APPARATUS FOR ESTIMATING MOTION CONSIDERING CORRELATION BETWEEN BLOCKS AND METHOD THEREOF

This application claims the benefit of Korean Patent Application No. 2003-52430 filed Jul. 29, 2003, in the Korean Intellectual Property Office, the disclosure of which is incorporated herein by reference.

BACKGROUND OF THE INVENTION

1. Field of the Invention

The present invention relates to a motion estimation apparatus and method based on a correlation between blocks, and more particularly, to a motion estimation apparatus and a method thereof, which can estimate motion based on the correlation between candidate motion vectors of a current block and motion vector blocks of neighboring blocks which surround the current block.

2. Description of the Related Art

In a general image process, such as a frame rate up-conversion (FRC) or an interlaced to progressive conversion (IPC), motion estimation between image frames is the essential process to be carried out. More specifically, the motion estimation estimates motion vectors for motion compensation, and is usually performed using a block matching algorithm (BMA).

The BMA compares two successively inputted frame/fields in a block unit, and estimates a single motion vector for each block. The motion vector is estimated by using a motion prediction error value, such as a sum of absolute difference (SAD) metric, and used in the motion compensation process.

Figure 1:
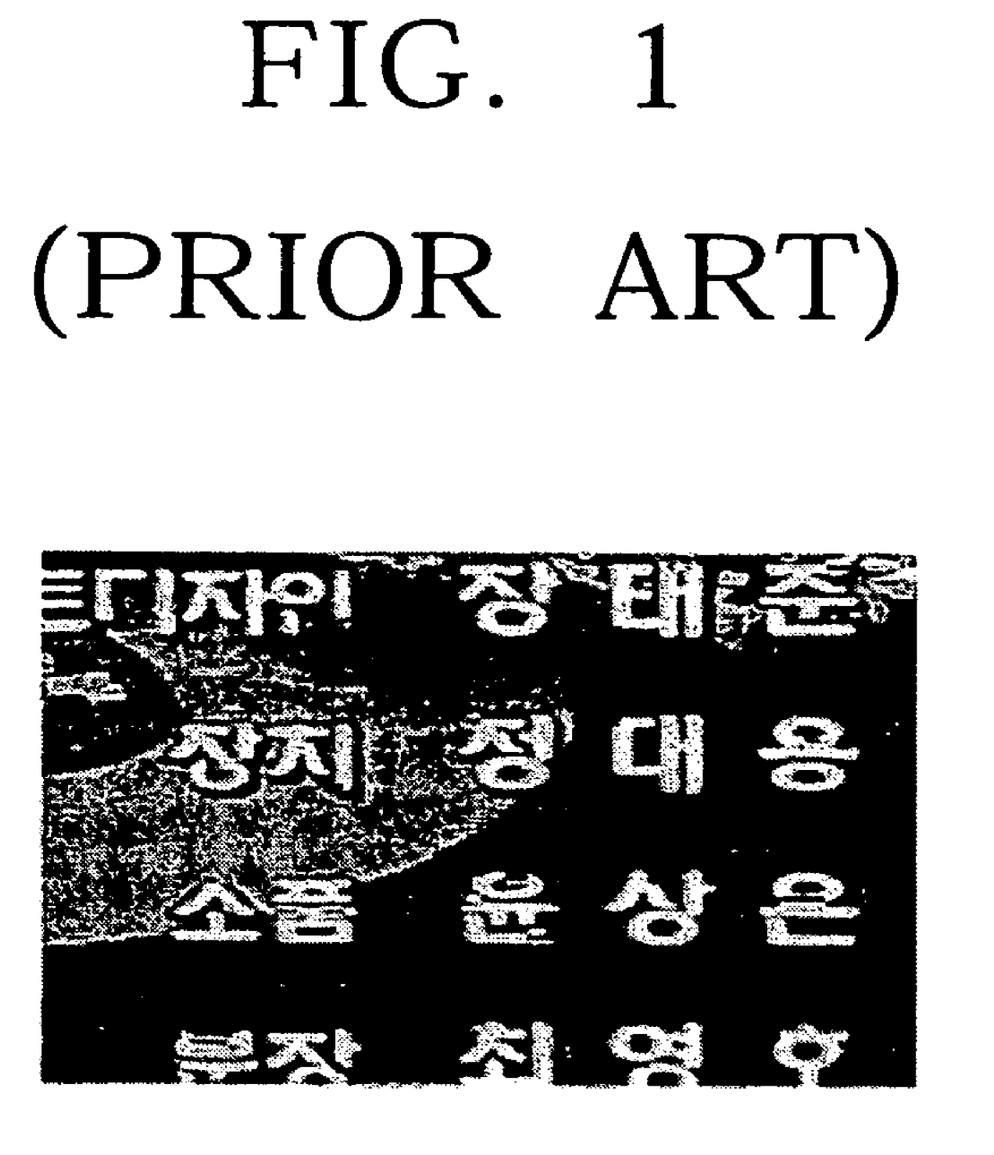
FIG. 1 is a view illustrating an exemplary image where a block artifact occurs in the execution of a conventional motion estimation method.

In the conventional motion estimation, motion vectors estimated for the respective blocks were often inaccurate, and there occurred a block artifact in an interpolated frame/field image as shown in FIG. 1 as the motion compensating process such as IPC and FRC is performed using inaccurate motion vectors. The block artifact is a certain blurring appearing usually in the borderline between adjacent blocks, resulting in unpleasant view of discontinuous borders and subsequent image quality degradation. The block artifact phenomenon occurs mainly because the motion compensation is performed for the respective blocks using estimated motion vectors without considering the correlation with the adjacent blocks.

SUMMARY OF THE INVENTION

The present invention has been developed in order to solve the above drawbacks and other problems associated with the conventional arrangement. An aspect of the present invention is to provide a motion estimation apparatus and a method thereof, which can estimate motion based on a correlation between candidate motion vectors of a current block and motion vector blocks of neighboring blocks which surround the current block.

The above aspects and/or other features of the present invention can be substantially achieved by a motion estimation apparatus which considers a correlation between blocks, comprising a full search unit to divide a current frame/field into blocks of a predetermined size, and estimate an arbitrary motion vector of each block by a full search algorithm; a candidate motion vector estimating unit to compute a plurality of motion prediction error values by applying a block matching algorithm (BMA) to a current block of the blocks for motion estimation, and estimate at least one candidate motion vector from the motion prediction error value below a predetermined threshold, for motion compensation of the current block; and a motion compensating unit to compute a correlation between the respective candidate motion vectors and the motion vectors of adjacent blocks which are adjacent to the current block, and compensate one among the candidate motion vectors to a final motion vector of the current block based on the computed correlation.

The full search unit computes the plurality of motion prediction error values by applying the BMA with respect to the respective blocks of the current frame/field, and estimates the arbitrary motion vector of the respective blocks from a location which has a minimum motion prediction error value.

The candidate motion vector estimating unit sets a search range of a predetermined size in a previous frame/field which is prior to the current block, computes the plurality of motion prediction error values by applying the BMA with respect to the search range, and sets the predetermined threshold by multiplying a minimum value among the plurality of motion prediction error values by a predetermined constant.

The motion compensating unit comprises: a correlation computing unit to compute a correlation between the respective candidate motion vectors and the motion vectors of the adjacent blocks adjacent to the current block; and a final motion vector estimating unit to estimate a candidate motion vector having a maximum correlation between the respective candidate motion vectors to be the final motion vector.

The correlation computing unit computes the correlation by, $$C(v_c) = \frac{1}{\sum_k |v_c - v_k|}, k = 1, 2, 3, \ldots, M$$

in which, $C(v_c)$ is a correlation between the candidate motion vectors and the motion vectors of the adjacent blocks, $v_c$ is the candidate motion vectors, $v_k$ is a motion vector of the adjacent blocks, and M is the number of adjacent blocks.

The correlation computing unit computes the correlation in consideration of a temporal direction, by including a previous block of a previous frame/field which corresponds in relative location with the current block and at least one block adjacent to the previous block into the adjacent blocks, the previous frame/field being inputted prior to the current frame/field.

The motion compensating unit further comprises a weight allocating unit to allocate a predetermined weight in accordance with a similarity between the current block and the adjacent blocks, and the correlation computing unit computes the correlation with the weight applied thereto, by, $$C(v_c) = \frac{1}{\sum_k w_k |v_c - v_k|}, k = 1, 2, 3, \ldots, M$$

in which, $C(v_c)$ is a correlation of the respective candidate motion vectors and the motion vectors of the adjacent blocks, $w_k$ is the weight, $v_c$ is the candidate motion vector, $v_k$ is the motion vector of the adjacent blocks, and M is the number of adjacent blocks.

According to one aspect of the present invention, a motion estimation method which considers a correlation between blocks, comprises a full search step of dividing a current frame/field into blocks of a predetermined size, and estimating an arbitrary motion vector of each block by a full search algorithm; a candidate motion vector estimating step of computing a plurality of motion prediction error values by applying a block matching algorithm (BMA) to a current block of the blocks for motion estimation, and estimating at least one candidate motion vector from the motion prediction error value below a predetermined threshold, for motion compensation of the current block; a motion compensating step of computing a correlation between the respective candidate motion vectors and the motion vectors of adjacent blocks which are adjacent to the current block; and a final motion vector estimating step of estimating a candidate motion vector having a maximum correlation to be a final motion vector of the current block.

The candidate motion vector estimating step sets a search range of a predetermined size in a previous frame/field which is prior to the current block, computes the plurality of motion prediction error values by applying the BMA with respect to the search range, and sets the predetermined threshold by multiplying a minimum value among the plurality of motion prediction error values by a predetermined constant.

According to another aspect of the present invention, a motion estimation apparatus which considers a correlation between blocks, comprises: a first motion estimating unit to divide an input frame/field into blocks of a predetermined size, and estimate a motion vector of each block; and a second motion estimating unit to set a first search range of a predetermined size based on the motion vector of a current block for motion estimation, and the motion vector of at least one adjacent block which is adjacent to the current block, and estimate a final motion vector of the current block by applying a block matching algorithm (BMA) with respect to the first search range based on the current block.

The second motion estimating unit comprises: an average vector computing unit to compute an average vector of the motion vectors of the current block and at least one adjacent block; a motion prediction error computing unit to set the first search range based on the computed average vector, and compute a plurality of motion prediction error values by applying the BMA; and a final motion vector estimating unit to estimate a final motion vector of the current block from a location which corresponds to a minimum motion prediction error value among the plurality of motion prediction error values as computed.

The first motion estimating unit sets a second search range of a predetermined size with respect to the respective divided blocks, and estimates the motion vectors of the respective divided blocks by the BMA.

According to yet another aspect of the present invention, a motion estimation method based on a correlation between blocks, comprises: a first motion estimating step of dividing an input frame/field into blocks of a predetermined size, and estimating a motion vector of each block; and a second motion estimating step of setting a first search range of a predetermined size based on the motion vector of a current block for motion estimation, and the motion vector of at least one adjacent block which is adjacent to the current block, and estimating a final motion vector of the current block by applying a block matching algorithm (BMA) with respect to the first search range based on the current block.

The second motion estimating step comprises: an average vector computing step of computing an average vector of the motion vectors of the current block and at least one adjacent block; a motion prediction error computing step of setting the first search range with based on the computed average vector, and computing a plurality of motion prediction error values by applying the BMA; and a final motion vector estimating step of estimating a final motion vector of the current block from a location which corresponds to a minimum motion prediction error value among the plurality of motion prediction error values as computed.

The first motion estimating step sets a second search range of a predetermined size with respect to the respective divided blocks of the frame/field, and estimates the motion vectors of the respective divided blocks by the BMA.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE EXEMPLARY EMBODIMENTS

Certain embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 2:
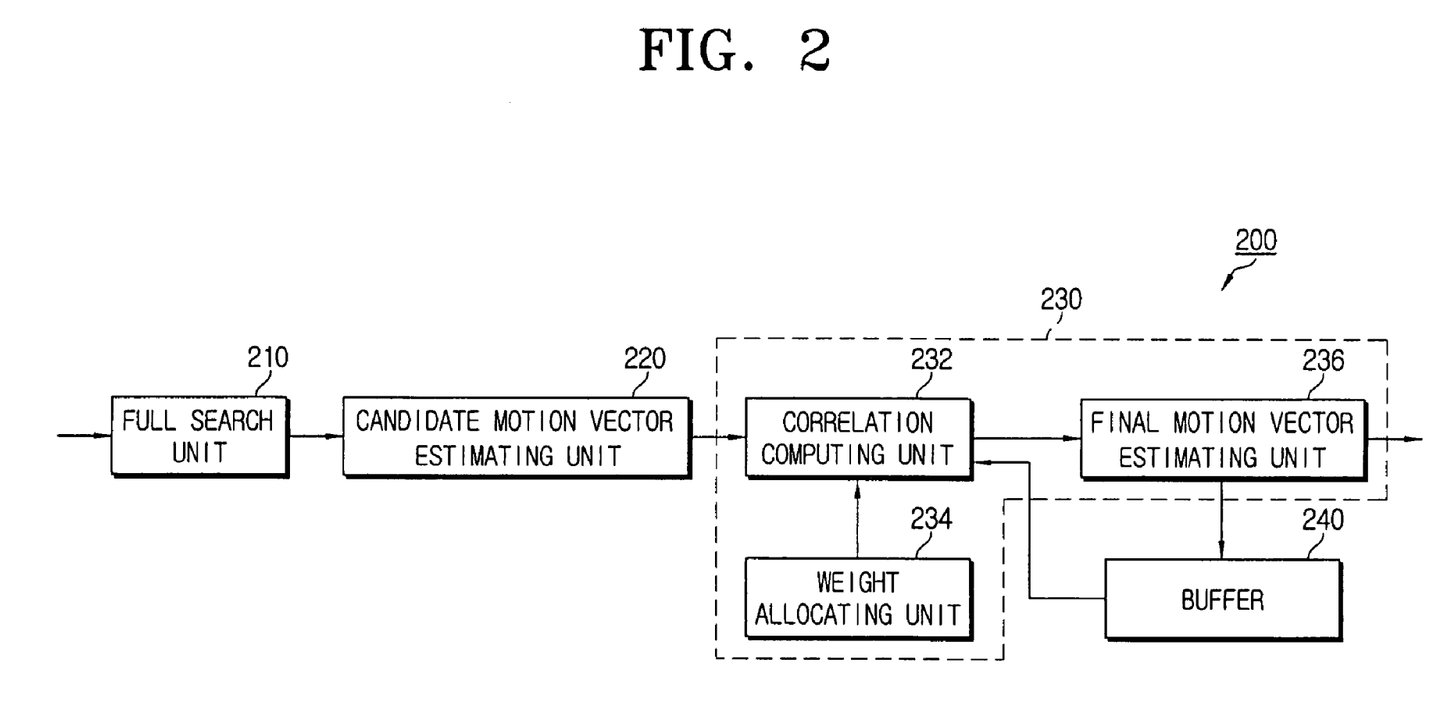
FIG. 2 is a block diagram illustrating a motion estimation apparatus considering a correlation between blocks according to a first exemplary embodiment of the present invention.
Figure 3:
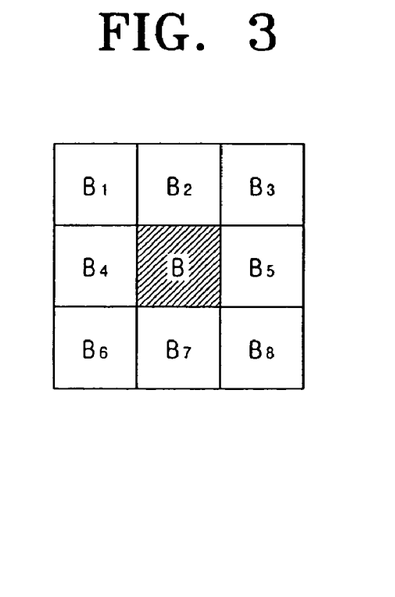
FIG. 3 is a block diagram illustrating a current block and neighboring blocks.

FIG. 2 is a block diagram schematically illustrating a motion estimation apparatus according to a first exemplary embodiment of the present invention, which considers a correlation between the blocks, and FIG. 3 is a view illustrating a current block and adjacent blocks surrounding the current block.

Referring to FIG. 2, the motion estimation apparatus 200 according to the first exemplary embodiment of the present invention includes a full search unit 210, a candidate motion vector estimating unit 220, a motion compensating unit 230 and a buffer 240.

Referring to FIG. 3, 'B' indicates a current block of a current frame/field, and 'B1 to B8' indicate adjacent blocks surrounding the current block B.

The full search unit 210 divides the current frame/field (hereinafter briefly called 'current frame') into blocks of a predetermined size, and estimates an arbitrary motion vector of each block. In the present specific embodiment, BMA is applied to the respective blocks to compute motion prediction errors. The full search unit 210 estimates an arbitrary motion vector of each block from the position having the minimum motion prediction error.

The motion prediction error can be computed by various ways including the sum of absolute difference (SAD), the mean absolute difference (MAD) and the mean square error (MSE). In this specific embodiment which uses SAD, the motion prediction error will be referred to as the SAD. However, it should be noted that the arbitrary motion vectors of the respective blocks can be estimated by other appropriate techniques instead of BMA.

The candidate motion vector estimating unit 220 estimates a candidate motion vector of the current block B using a prescreening process. More specifically, the candidate motion vector estimating unit 220 estimates at least one candidate motion vector of the current block B by re-applying the BMA to the current block B.

To describe the above in more detail, with reference to the current block B, the candidate motion vector estimating unit 220 sets a predetermined search range in a previous frame/field (hereinafter briefly called 'previous frame'), and computes a plurality of SADs by applying the BMA to the predetermined search range. The candidate motion vector estimating unit 220 then estimates the candidate motion vectors of the current block B, from the location that corresponds to the SAD below a predetermined threshold. The number of candidate motion vectors is equal to the number of SADs below the predetermined threshold. In the present embodiment, the value obtained by multiplying the minimum of the SADs by a predetermined constant α, α×minimum SAD, is used as the predetermined threshold.

This is to consider the possibility that a motion vector representing an actual movement of the current block B is contained in the candidate motion vectors having SADs below α×minimum SAD threshold, and thus to have more accurate final motion vector of the current block. For example, the present embodiment may use α=1.5. Of course, this value is adjustable as necessary.

The motion compensating unit 230 includes a correlation computing unit 232 and a final motion vector estimating unit 236.

The correlation computing unit 232 computes a correlation between at least one estimated candidate motion vector and the motion vectors of the adjacent blocks B1 to B8. The correlation computing unit 232 measures a correlation between the candidate motion vectors estimated by pre-screening and the motion vectors of the adjacent blocks B1 to B8. A vector distance is used as a measure for the computation of correlation between vectors, and the correlation is computed by the following formula:

$$C(v_c) = \frac{1}{D(v_c)} = \frac{1}{\sum_k |v_c - v_k|}, k = 1, 2, 3, \ldots, M \quad \text{[Formula 1]}$$

in which, $C(v_c)$ is a correlation between the candidate motion vectors and the motion vectors of the adjacent blocks B1 to B8, $D(v_c)$ is a vector distance, $v_c$ is a candidate motion vector, $v_k$ is a motion vector of the adjacent blocks $B_1$ to $B_8$, and M is the number of adjacent blocks $B_1$ to $B_8$. The adjacent blocks $B_1$ to $B_8$ refer to the blocks that are adjacent to the current block B, which are, when considering the spatial correlation alone, located in the same current frame as the current block B (see FIG. 3).

Referring to the formula 1, the correlation is in inverse proportion to $D(v_c)$ and accordingly, the correlation increases as the $D(v_c)$ decreases.

Figure 4:
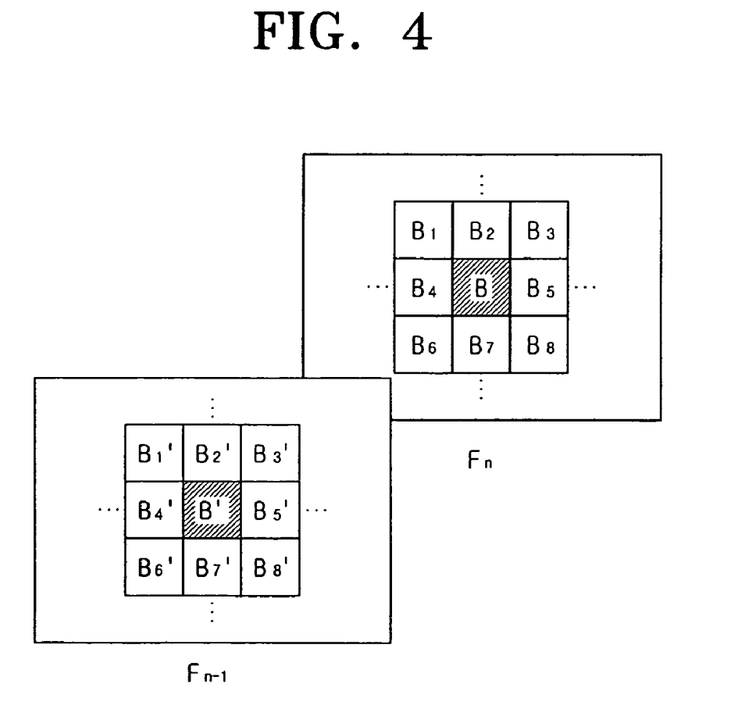
FIG. 4 is a view for illustrating the correlation computing unit of FIG. 2 computing the correlation between the blocks, with considering a temporal direction.

Meanwhile, in addition to the spatial direction, the correlation computing unit 232 can also compute the correlation based on the temporal direction, which is illustrated in FIG. 4. Accordingly, the correlation computing unit 232 computes spatial and temporal correlation, considering the motion vector of a previous block B' of the previous frame $F_{n-1}$ which corresponds in location to the current block B, and the motion vectors of at least one of adjacent blocks $B_1'$ to $B_8'$ surrounding the previous block B'. The previous frame $F_{n-1}$ refers to a frame which is input prior to the current frame $F_n$.

Accordingly, not only the adjacent blocks $B_1$ to $B_8$ as shown in FIG. 3, but also at least one block $B_1'$ to $B_8'$ of the previous block B' is determined to be the adjacent block to the current block B. As for the motion vectors of the blocks of the previous frame, the motion vectors of the respective blocks which have already been estimated by a final motion vector estimating unit 236 (described later), are used.

The number of adjacent blocks used by the correlation computing unit 232 can be adjusted adaptively in accordance with the frequency of the image sampling and the size of blocks. For example, with a higher sampling frequency (or resolution) and with smaller size blocks, the adjacent blocks used by the correlation computing unit 232 are expandable temporally and spatially.

Based on the correlation computed with the formula 1, the final motion vector estimating unit 236 estimates a candidate motion vector having a maximum correlation to be a final motion vector of the current block B. Accordingly, as the arbitrary motion vector of the current block, which is estimated by the full search unit 210 through the BMA, is compensated by using a correlation with the adjacent blocks $B_1$ to $B_8$ and/or $B_1'$ to $B_8'$, the final motion vector is estimated.

The final motion vectors of the respective blocks of the current frame, which are estimated by the final motion vector estimating unit 236, are temporarily stored in the buffer 240 in the frame unit. The temporarily-stored final motion vectors are used for the correlation computing unit 232 to consider the temporal correlation. That is, the temporarily-stored final motion vectors of the respective blocks of the current frame are used in the case of estimating the final motion vectors of the blocks of the next frame.

Meanwhile, the correlation computing unit 232 may apply a predetermined weight in accordance with a similarity between the current block B and the respective adjacent blocks $B_1$ to $B_8$. To this end, the motion compensating unit 230 may further include a weight allocating unit 234.

The weight allocating unit 234 computes a predetermined weight in accordance with the similarity between the current block B and the adjacent blocks $B_1$ to $B_8$. The weight allocating unit 234 allocates a larger weight to the adjacent blocks $B_1$ to $B_8$ which has more similar image characteristics to the current block B. The similarity of the image characteristics is the measure which determines whether the current block B and the adjacent blocks $B_1$ to $B_8$ belong to the categories of identical motion, similar motion or different motion.

The weight allocating unit 234 determines the similarity of the current block B and the adjacent blocks $B_1$ to $B_8$ in the image characteristics, using measurement references such as a gradient, a texture, a pixel average and pixel dispersion. For example, the weight allocating unit 234 computes the gradients of the current block B and the adjacent blocks $B_1$ to $B_8$, and allocates a weight which is in an inverse proportion to the gradient difference. Accordingly, the current block B and the adjacent blocks $B_1$ to $B_8$ are determined to be more similar with each other as the difference of the measurement reference is smaller. In order to compute the weight, the weight allocating unit 234 is provided with the pixel information of the current frame and/or the previous frame, i.e., with the brightness value of the respective pixels. In the case of considering the other measurement reference such as the texture, average value and dispersion, the weight allocating unit 234 also allocates a weight in an inverse proportion to the difference of the reference.

Figure 5:
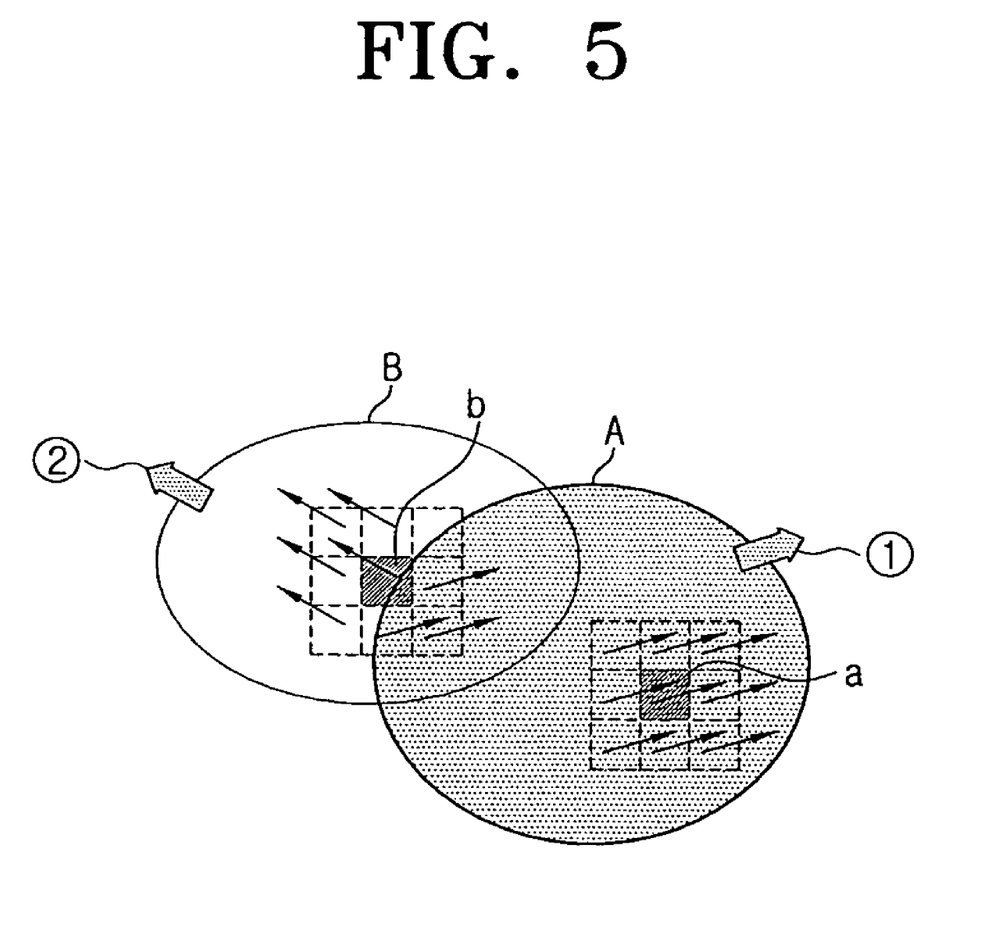
FIG. 5 is a view illustrating a certain exemplary case in which the weight allocating unit of FIG. 2 allocates weights to two-differently-moving objects.

Allocating the weight can be especially useful in estimating the motion vectors of the blocks of two differently-moving objects (see FIG. 5).

Referring to FIG. 5, with respect to an object A moving in direction ①, the current block (a) and the adjacent blocks have the vector properties in the same direction. Accordingly, in compensating the arbitrary motion vector of the current block (a) which is relatively inaccurate due to noise influence, the motion compensating unit 230 can compensate the motion vector of the current block (a) without using a weight, by using the arbitrary motion vectors of the adjacent blocks.

Meanwhile, an object B is moving in direction ②. In the case of compensating an arbitrary motion vector of the current block (b) where the two objects A and B of different moving directions overlap, because the adjacent blocks belong to different objects A and B, respectively, motion compensation may not be performed with accuracy. In this case, the motion compensating apparatus 230 according to the present invention allocates a larger weight to the motion vectors of the adjacent blocks that have more similar image characteristics as the current block (b). As a result, motion compensation can be performed more accurately. That is, by allocating more weights to more similar adjacent blocks, the motion compensation can be made more accurately.

Of course, the weights can be used not only for the differently-moving objects, but also for the similarly, or identically-moving two objects.

Referring back to FIG. 2, the weights computed in accordance with the similarity of the current block B and the adjacent blocks $B_1$ to $B_8$, are provided to the correlation computing unit 232, and the correlation computing unit 232 computes a correlation using the following formula 2:

$$C(v_c) = \frac{1}{D(v_c)} = \frac{1}{\sum_k w_k |v_c - v_k|}, k = 1, 2, 3, \ldots, M \quad \text{[Formula 2]}$$

in which, $C(v_c)$ is a correlation of the respective candidate motion vectors and the motion vectors of the adjacent blocks $B_1$ to $B_8$, $w_k$ is a weight, $v_c$ is a candidate motion vector, $v_k$ is a motion vector of adjacent blocks $B_1$ to $B_8$, and M is the number of adjacent blocks $B_1$ to $B_8$. Because the formula 2 is similar to formula 1, which has been described above, except for the weight allocation, explanation of the formula 2 will be omitted.

In addition to the current frame, the weight allocating unit 234 can compute a weight to allocate to the formula 2 by determining a similarity between the blocks B, $B_1'$ to $B_8'$ of the previous frame, which are stored in advance.

The final motion vector estimating unit 236 estimates a candidate motion vector having the maximum correlation among the correlations computed by the formula 2 to be a final motion vector of the current block B. The final motion vector of the respective blocks are temporarily stored in the buffer 240 in the frame unit.

Figure 6:
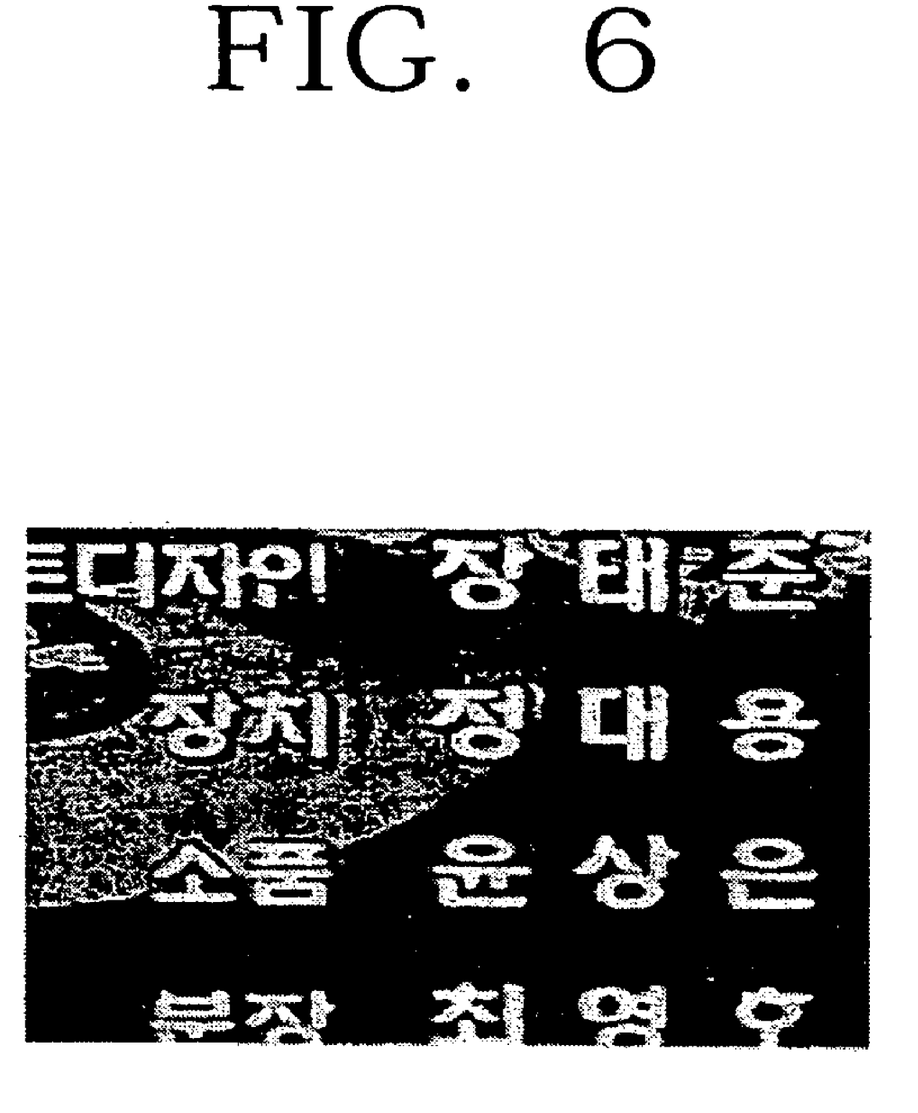
FIG. 6 is a view illustrating an exemplary image in which block artifact is reduced by the motion estimation apparatus of FIG. 2.

With the motion estimation apparatus 200 according to the first exemplary embodiment of the present invention, an image with reduced block artifact can be provided as shown in FIG. 6.

Figure 7:
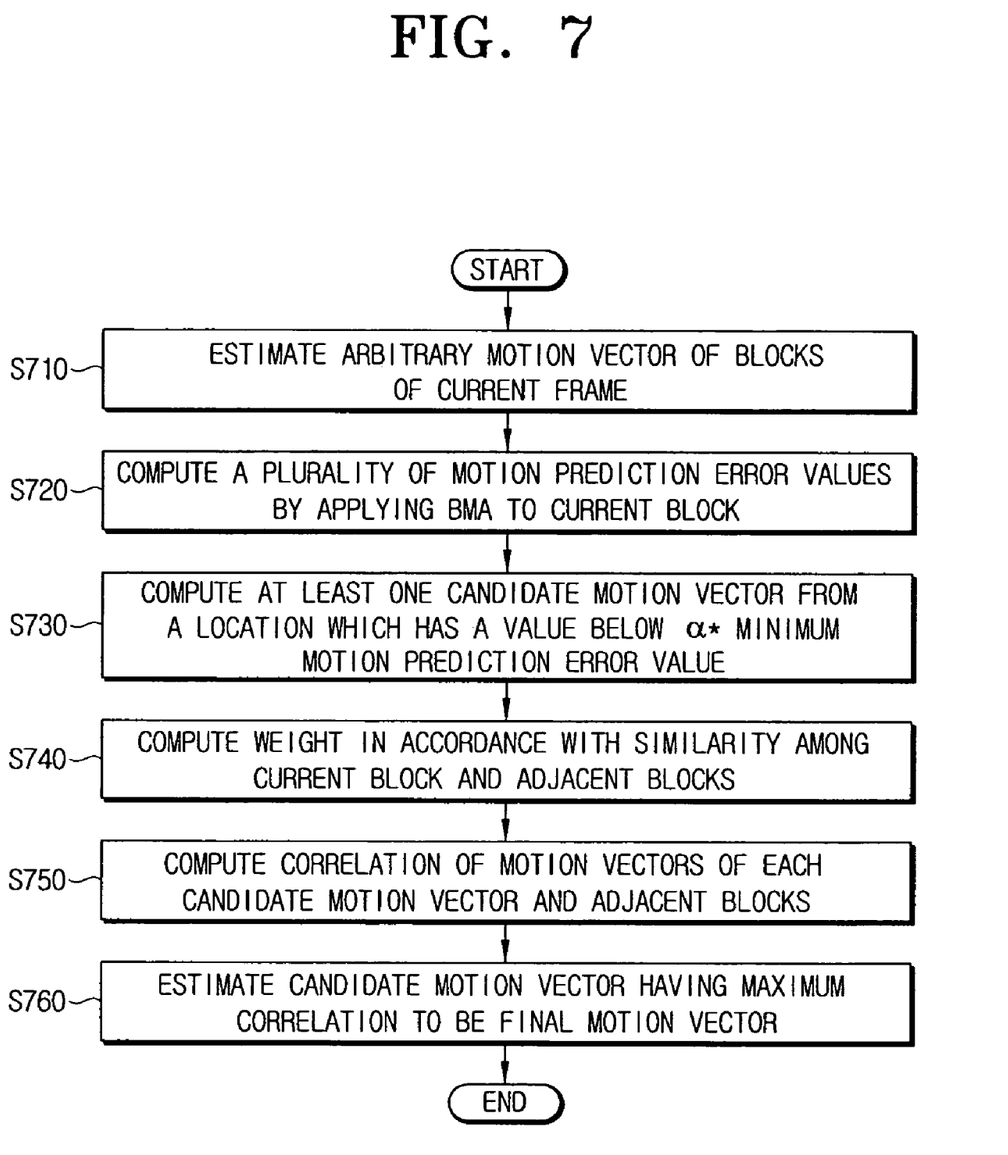
FIG. 7 is a flowchart for schematically illustrating the motion estimation process carried out by the apparatus of FIG. 2.

FIG. 7 is a flowchart schematically illustrating the process of motion estimation process by FIG. 2.

Referring to FIGS. 2 to 7, the full search unit 210 divides the current frame into blocks of a predetermined size, and estimates the arbitrary motion vectors of the respective blocks by using the full search BMA (step S710). In completing S710, the candidate motion vector estimating unit 220 computes a plurality of motion prediction error values such as SADs, by re-applying the BMA to the current block B (step S720).

From the location having at least one SAD that corresponds to the SAD below a predetermined threshold, the candidate motion vector estimating unit 220 estimates at least one candidate motion vector for the compensation of the current block B (step S730). The predetermined threshold of S730 is the value obtained by multiplying the minimum SAD by a predetermined constant, and in the present embodiment, $\alpha = 1.5$ is applied as the predetermined threshold.

In completing S730, the weight allocating unit 234 computes a weight in accordance with the similarity between the current block B and the adjacent blocks $B_1$ to $B_8$ (step S740).

The correlation computing unit 232 computes a correlation of the respective candidate motion vectors and the motion vectors of the adjacent blocks $B_1$ to $B_8$, considering the weight which is computed and allocated in S740 (step S750). That is, the correlation computing unit 232 computes a correlation using the formula 2, considering not only the spatial correlation but also the temporal correlation.

In completing S750, the final motion vector estimating unit 236 estimates the candidate motion vector having the maximum correlation among at least one candidate motion vector to be a final motion vector (step S760). Accordingly, a final motion vector, which is the result of compensating the arbitrary motion vector estimated in S710 for the current block, is generated.

Meanwhile, in the motion estimation method according to the first exemplary embodiment of the present invention, S740 may be omitted if the similarity between the current block B and the adjacent blocks $B_1$ to $B_8$ is not to be considered, and it is preferable that S750 computes a correlation using the formula 1.

With the motion estimation method according to the first exemplary embodiment of the present invention, images with reduced block artifact can be provided as shown in FIG. 6.

Figure 8:
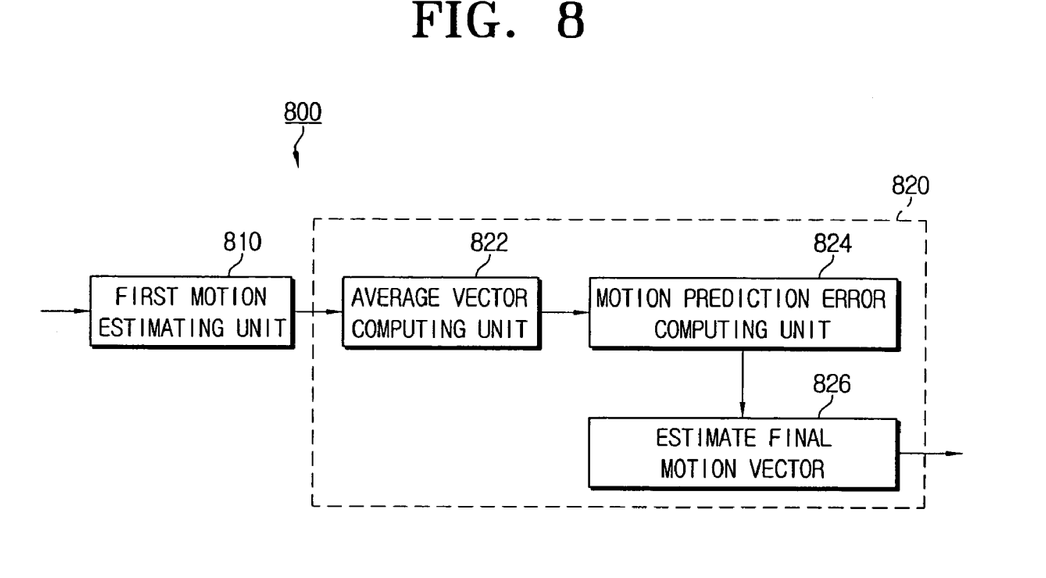
FIG. 8 is a block diagram illustrating a motion estimation apparatus which considers a correlation between the blocks according to a second exemplary embodiment of the present invention.
Figure 9:
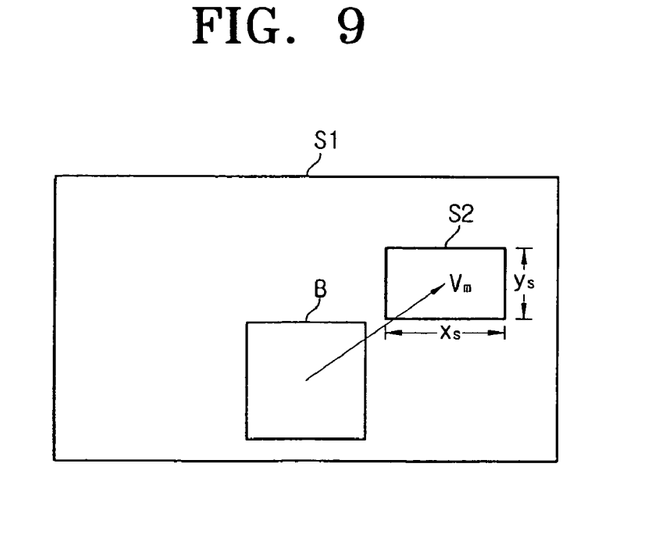
FIG. 9 is a view illustrating a certain exemplary case in which a final motion vector is computed using the average vector which is computed by the average vector computing unit of FIG. 8.

FIG. 8 is a block diagram illustrating a motion estimation apparatus which considers a correlation between the blocks according to a second exemplary embodiment of the present invention, and FIG. 9 is a view illustrating the case where a final motion vector is computed using the average vector which is computed by the average vector computing unit of FIG. 8.

Referring to FIG. 8, the motion estimation apparatus 800 considering a correlation between the blocks according to the second exemplary embodiment of the present invention, includes a first motion estimation unit 810 and a second motion estimation unit 820.

The first motion estimation unit 810 divides the currently-input frame (hereinafter briefly called a 'current frame') into blocks of predetermined size, and estimates motion vectors of the respective blocks. To describe it in greater detail, the first motion estimation unit 810 computes a plurality of SADs by applying the BMA to the respective blocks of the current frame. The first motion estimation unit 810 then estimates the motion vectors of the respective blocks from a location having a minimum SAD. For example, the first motion estimation unit 810 sets a first search range S1 of a predetermined size with reference to the current block B, and estimates a motion vector of the current block B by full search BMA.

The second motion estimation unit 820 sets a second search range S2 of a predetermined size, by using the motion vectors of the current block B and at least one adjacent block (not shown) of the current block B. The second motion estimating unit 820 estimates a final motion vector of the current block B, by re-applying the BMA to the second search range S2 with respect to the current block B. Accordingly, the second motion estimating unit 820 includes an average vector computing unit 822, a motion prediction error computing unit 824 and a final motion vector estimating unit 826.

The average vector computing unit 822 computes an average vector of the motion vectors of the current block B and at least one adjacent block (not shown) with the following formula 3. The average vector is obtained by averaging the vertical and horizontal properties of the motion vectors of the current block B and the adjacent block (not shown). The adjacent block (not shown) refers to a block which is adjacent to the current block B and located in the same current frame as the current block B.

$$v_m = \frac{1}{N} \sum_{k=0}^{N-1} v_k \qquad \text{[Formula 3]}$$

in which, $v_m$ is an average vector of the motion vectors of the current block B and at least one adjacent block (not shown), N is the number of the current block B and at least one adjacent block (not shown), and $v_k$ is the motion vector of the current block B and at least one adjacent block (not shown) which is estimated at the first motion estimating unit 810.

As shown in FIG. 9, the motion prediction error computing unit 824 sets the second search range S2 with respect to the average vector, and computes a plurality of motion prediction error values such as a SAD by applying the BMA. The second search range S2 is smaller than the first search range S1, and it is preferable that the second search range S2 is set with the size during the designing process of the motion estimation apparatus 800.

The size of the second search range S2 may be adjusted adaptively, i.e., in accordance with the correlation between the motion vectors of the adjacent blocks. That is, if the adjacent vectors represent the same direction, the second search range S2 may be reduced in size, and if not, i.e., if the adjacent vectors represent different directions, the second search range S2 may be expanded. Expanding and contracting the second search range S2 may also be adjusted separately in the horizontal direction $x_s$ and vertical direction $y_s$. Further, expanding and contracting the second search range S2 may also be adjusted adaptively at the motion prediction error computing unit 824 in accordance with the mechanism as designed.

The final motion vector estimating unit 826 estimates a final motion vector of the current block B, from the location which corresponds to the minimum SAD among the plurality of SADs that are computed by the motion prediction error computing unit 824.

With the motion estimation apparatus 800 according to the second exemplary embodiment of the present invention, the second search range S2, which is contracted with respect to the average vector, is set, and the final motion vector is estimated by re-applying the BMA. In other words, the area, which has a high possibility of having the actual movement, is predicted by using the average vector, and such predicted area is contracted and the final motion vector of the current block B is estimated in the contracted search range. As a result, because the area having the high possibility of having actual movement is predicted by average vector and contracted, possible error in motion estimation is prevented.

Figure 11:
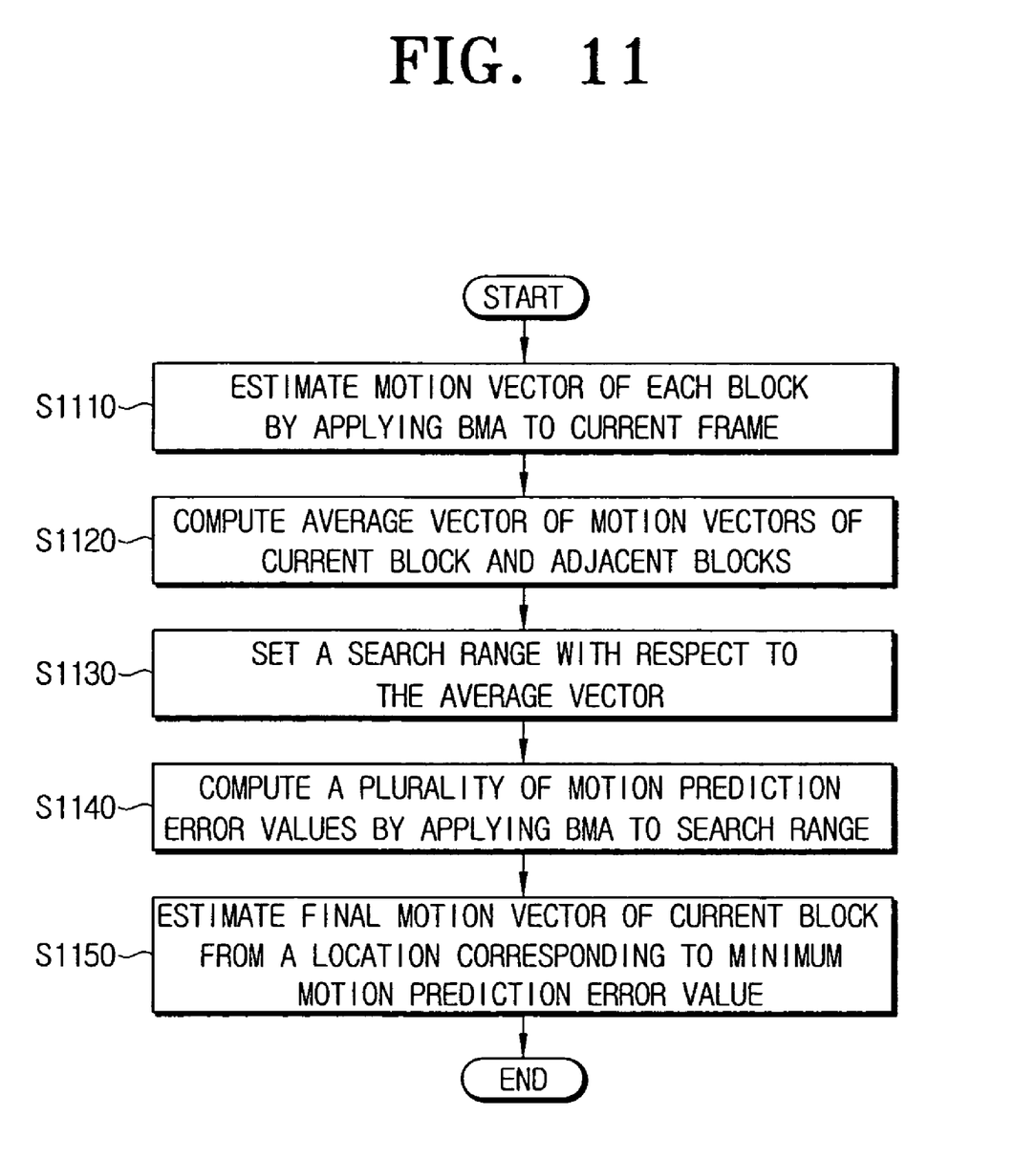
FIG. 11 is a flowchart for schematically illustrating the motion estimation method carried out by the apparatus of FIG. 8.

FIG. 11 is a flowchart schematically showing the motion estimation method by FIG. 8.

Referring to FIGS. 8 to 11, the first motion estimation unit 810 divides the currently-input frame, i.e., current frame into blocks of a predetermined size, and estimates the motion vectors of the blocks by the BMA (step S1110). For example, the first motion estimation unit 810 sets a first search range S1 with respect to the current block B, and estimates a motion vector of the current block B by the full search BMA.

In completing S1110, the average vector computing unit 822 computes an average vector of the motion vectors of the current block B and at least one adjacent block by using the formula 3 (step S1120). Next, the motion prediction error computing unit 824 sets a second search range (S2) with respect to the average vector (step S1130), and computes a plurality of motion prediction error values such as a SAD by re-applying the BMA (step S1140). Here, the second search range S2 is contracted to be smaller than the first search range S1, and preferably, included in the first search range S1.

In completing S1140, the final motion vector estimating unit 826 estimates a final motion vector of the current block B, from the location which corresponds to the minimum SAD among the plurality of computed SADs (step S1150).

Figure 10:
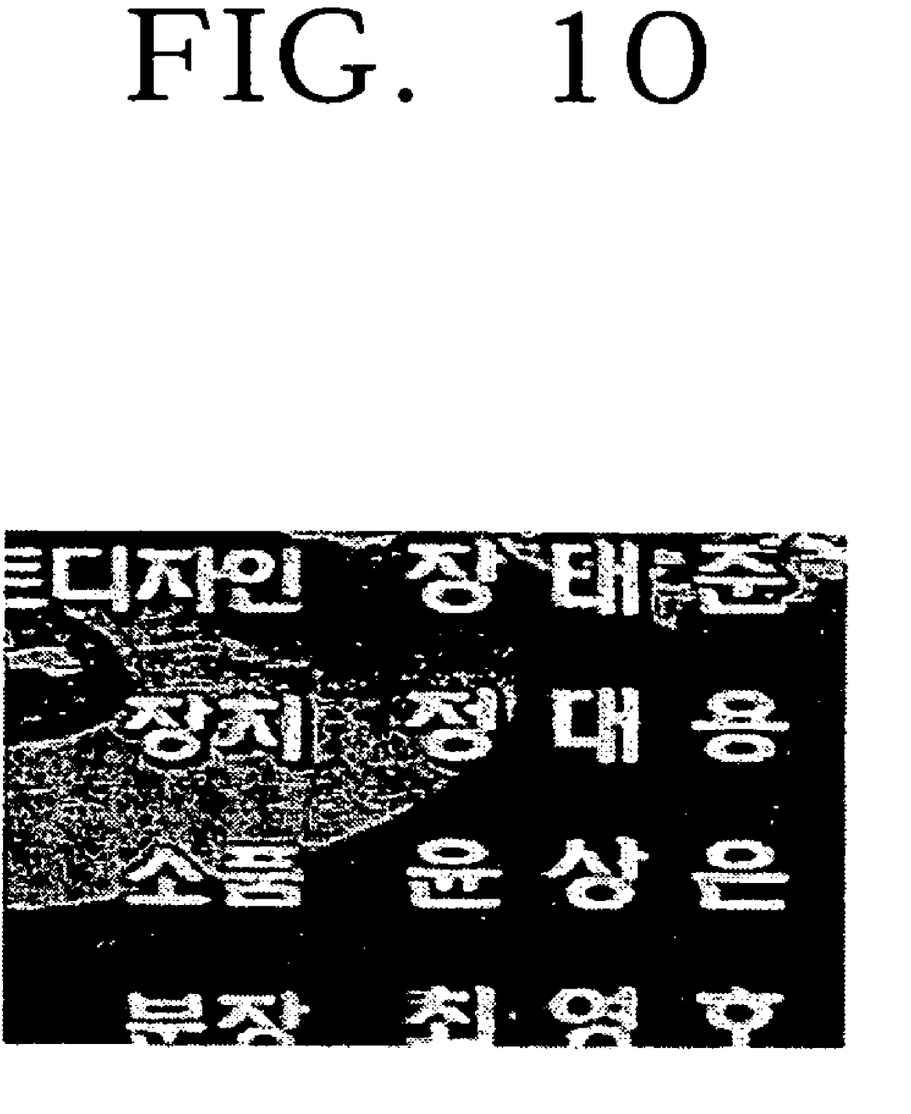
FIG. 10 is a view illustrating a simulation example of an image in which a block artifact is reduced by the apparatus of FIG. 8.

With the motion estimation apparatus 800 and the method thereof according to the second exemplary embodiment of the present invention, images with reduced block artifact can be provided as shown in FIG. 10.

As described so far, with the motion estimation apparatus and method thereof, which considers a correlation between the blocks, motion vectors of the blocks, which may be estimated inaccurately, can be compensated/estimated accurately by using the motion vectors of the adjacent blocks. In the case of having similar movement in two adjacent blocks, inaccurately-estimated motion vector can be compensated to a motion vector close to the actual movement, and visually-pleasant, naturally-interpolated images can be provided. Especially by applying the present invention to the IPC and FRC, occurrence of block artifact can be prevented or restrained, and as a result, image quality improves.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A motion estimation apparatus which considers a correlation between blocks, comprising:
   a full search unit to divide a current frame/field into blocks of a predetermined size, and estimate an arbitrary motion vector of each block by a full search algorithm;
   a candidate motion vector estimating unit to compute a plurality of motion prediction error values by applying a block matching algorithm (BMA) to a current block of the blocks for motion estimation, and estimate at least one candidate motion vector from the motion prediction error values below a predetermined threshold, for motion compensation of the current block; and
   a motion compensating unit to compute a correlation between the at least one candidate motion vector and the arbitrary motion vectors of adjacent blocks which are adjacent to the current block, and compensate the at least one candidate motion vector to a final motion vector of the current block based on the computed correlation.

2. The motion estimation apparatus of claim 1, wherein the full search unit computes the plurality of motion prediction error values by applying the BMA with respect to the respective blocks of the current frame/field, and estimates the arbitrary motion vector of the respective blocks from a location which has a minimum motion prediction error value.

3. The motion estimation apparatus of claim 1, wherein the candidate motion vector estimating unit sets a search range of a predetermined size in a previous frame/field which is prior to the current block, computes the plurality of motion prediction error values by applying the BMA with respect to the search range, and sets the predetermined threshold by multiplying a minimum value among the plurality of motion prediction error values by a predetermined constant.

4. The motion estimation apparatus of claim 1, wherein the candidate motion vector estimating unit estimates at least two candidate motion vectors and the motion compensating unit comprises:
   a correlation computing unit to compute a correlation between the at least two candidate motion vectors and the arbitrary motion vectors of the adjacent blocks adjacent to the current block; and
   a final motion vector estimating unit to estimate a candidate motion vector having a maximum correlation among the at least two candidate motion vectors to be the final motion vector of the current block.

5. The motion estimation apparatus of claim 4, wherein the correlation computing unit computes the correlation by, $$C(v_c) = \frac{1}{\sum_k |v_c - v_k|}, k = 1, 2, 3, \ldots, M$$

in which, $C(v_c)$ is a correlation between the respective at least two candidate motion vectors and the arbitrary motion vectors of the adjacent blocks, $v_c$ is the respective candidate motion vector among the at least two candidate motion vectors, $v_k$ is a motion vector of the adjacent blocks, and M is the number of adjacent blocks.

6. The motion estimation apparatus of claim 4, wherein the correlation computing unit computes the correlation in consideration of a temporal direction, by including a previous block of a previous frame/field which corresponds in relative location with the current block and at least one block adjacent to the previous block into the adjacent blocks, the previous frame/field being inputted prior to the current frame/field.

7. The motion estimation apparatus of claim 4, wherein the motion compensating unit further comprises a weight allocating unit to allocate a weight in accordance with a similarity between the current block and the respective adjacent block, and
   the correlation computing unit computes the correlation with the weight applied thereto, by, $$C(v_c) = \frac{1}{\sum_k w_k |v_c - v_k|}, k = 1, 2, 3, \ldots, M$$

in which, $C(v_c)$ is a correlation between the respective at least two candidate motion vectors and the arbitrary motion vectors of the adjacent blocks, $w_k$ is the weight of the respective adjacent block, $v_c$ is the respective candidate motion vector among the at least two candidate motion vectors, $v_k$ is the motion vector of the adjacent blocks, and M is the number of adjacent blocks.

8. The motion estimation apparatus of claim 1, wherein the plurality of the motion prediction error values are computed by one among a sum of absolute difference (SAD), a mean absolute difference (MAD) and a mean square error (MSE).

9. A motion estimation method of a motion estimation apparatus which considers a correlation between blocks, comprising:
   a full search step of dividing, using a processor, a current frame/field into blocks of a predetermined size, and estimating an arbitrary motion vector of each block by a frill search algorithm;
   a candidate motion vector estimating step of computing, using the processor, a plurality of motion prediction error values by applying a block matching algorithm (BMA) to a current block of the blocks for motion estimation, and estimating at least one candidate motion vector from the motion prediction error values below a predetermined threshold, for motion compensation of the current block;
   a motion compensating step of computing, using the processor, a correlation between the at least one candidate motion vector and the arbitrary motion vectors of adjacent blocks which are adjacent to the current block; and
   a final motion vector estimating step of estimating, using the processor, a candidate motion vector among the at least one candidate motion vector having a maximum correlation with the adjacent blocks to be a final motion vector of the current block.

10. The motion estimation method of claim 9, wherein the full search step computes the plurality of motion prediction error values by applying the BMA with respect to the respective blocks of the current frame/field, and estimates the arbitrary motion vector of the respective blocks from a location which has a minimum motion prediction error value.

11. The motion estimation method of claim 9, wherein the candidate motion vector estimating step sets a search range of a predetermined size in a previous frame/field which is prior to the current block, computes the plurality of motion prediction error values by applying the BMA with respect to the search range, and sets the predetermined threshold by multiplying a minimum value among the plurality of motion prediction error values by a predetermined constant.

12. The motion estimation method of claim 9, wherein the motion compensating step computes the correlation by, $$C(v_c) = \frac{1}{\sum_k |v_c - v_k|}, k = 1, 2, 3, \ldots, M$$

in which, $C(v_c)$ is a correlation between the respective at least two candidate motion vectors and the arbitrary motion vectors of the adjacent blocks, $v_c$ is the respective candidate motion vector among the at least two candidate motion vectors, $v_k$ is a motion vector of the adjacent blocks, and M is the number of adjacent blocks.

13. The motion estimation method of claim 12, wherein the motion compensating step computes the correlation in consideration of a temporal direction, by including a previous block of a previous frame/field which corresponds in relative location with the current block and at least one block adjacent to the previous block into the adjacent blocks, the previous frame/field being inputted prior to the current frame/field.

14. The motion estimation method of claim 9, further comprising:
prior to the motion compensating step, a weight allocating step of allocating a weight in accordance with a similarity between the current block and the respective adjacent block, and
the correlation computing step computes the correlation with the weight applied thereto, by, $$C(v_c) = \frac{1}{\sum_k w_k |v_c - v_k|}, k = 1, 2, 3, \ldots, M$$

in which, $C(v_c)$ is a correlation between the respective at least two candidate motion vectors and the arbitrary motion vectors of the adjacent blocks, $w_k$ is the weight of the respective adjacent block, $v_c$ is the respective candidate motion vector among the at least two candidate motion vectors, $v_k$ is the motion vector of the adjacent blocks, and M is the number of adjacent blocks.

15. The motion estimation method of claim 9, wherein the plurality of the motion prediction error values are computed by one among a sum of absolute difference (SAD), a mean absolute difference (MAD) and a mean square error (MSE).

16. The motion estimation apparatus of claim 1, wherein the at least one candidate motion vector for motion compensation of the current block is estimated independent of the arbitrary motion vectors of the blocks adjacent to the current block.

17. The motion estimation apparatus of claim 1, wherein the motion compensating unit computes the correlation between the at least one motion vector and the arbitrary motion vectors of the adjacent blocks based on a difference between the at least one candidate motion vector and the arbitrary motion vectors of the adjacent blocks.

18. The motion estimation method of claim 9, wherein in the candidate motion vector estimating step, the at least one candidate motion vector for motion compensation of the current block is estimated independent of the arbitrary motion vectors of the blocks adjacent to the current block.

19. The motion estimation method of claim 9, wherein in the motion compensating step, the correlation between the at least one motion vector and the arbitrary motion vectors of the adjacent blocks is computed based on a difference between the at least one candidate motion vector and the arbitrary motion vectors of the adjacent blocks.

* * * * *